United States Patent [19]

Moore

[11] Patent Number: 4,505,066

[45] Date of Patent: Mar. 19, 1985

[54] INDOOR GREENHOUSE

[76] Inventor: Patrick D. Moore, S.S. #1, Kamloops, British Columbia, Canada, V2C 5N6

[21] Appl. No.: 388,822

[22] Filed: Jun. 16, 1982

[30] Foreign Application Priority Data

Mar. 15, 1982 [CA] Canada .................................. 398297

[51] Int. Cl.³ ................................................ A01G 9/00
[52] U.S. Cl. ..................................................... 47/17
[58] Field of Search ............... 47/17; 52/82, 236.1, 52/36; 248/239; 312/114, 324; 217/65; 220/255

[56] References Cited

U.S. PATENT DOCUMENTS

| | | | |
|---|---|---|---|
| 2,256,050 | 9/1941 | Hansen | 47/17 |
| 4,058,356 | 11/1977 | Michal | 312/324 |
| 4,244,145 | 1/1981 | Polacsek | 47/17 |

Primary Examiner—Robert A. Hafer
Assistant Examiner—Bradley M. Lewis
Attorney, Agent, or Firm—Fetherstonhaugh & Co.

[57] ABSTRACT

A housing, which is particularly suitable as an indoor greenhouse, is provided. The housing comprises a frame which has a base with a lower surface, and a plurality of elongated parallel support members. The support members are connected to the base so as to extend therefrom perpendicular to the lower surface, and perpendicularly through respective alternate apices of a first, substantially regular polygon. The frame also has a top which is connected between a top end of each of the support members. The housing also comprises connecting means attached to the frame for connecting a pair of rectangular doors to it so that each is movable between an open and a closed position. The connecting means also connects the doors to the frame so that the pair extend between the base, the top, and a pair of adjacent support members, and perpendicularly through respective adjacent sides of the first polygon, when both doors are in the closed position. The housing is preferably transversely hexagonal shaped, and has a plurality of socket means connected to the support members for mounting each of a plurality of light tubes along an inner surface of a corresponding support member. A control housing is preferably provided at the top of the housing, which control housing contains ballasts for fluorescent light tubes and a fan arranged to circulate air through the greenhouse.

6 Claims, 4 Drawing Figures

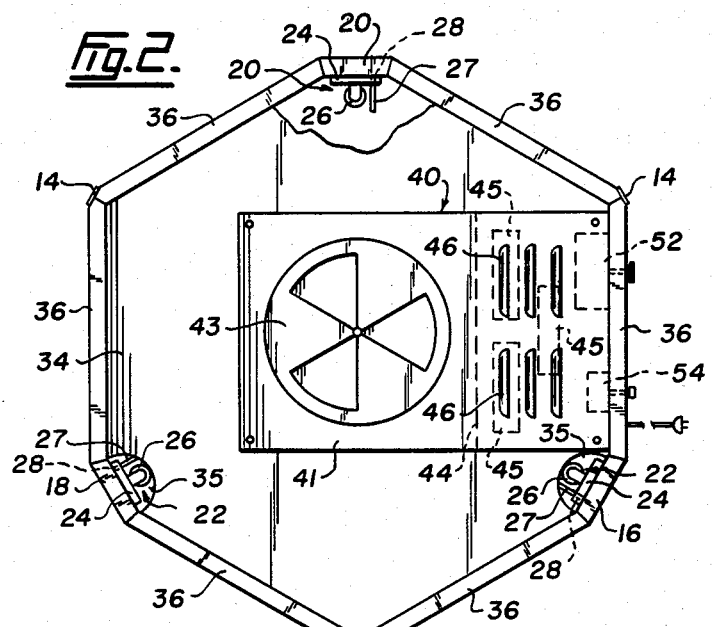
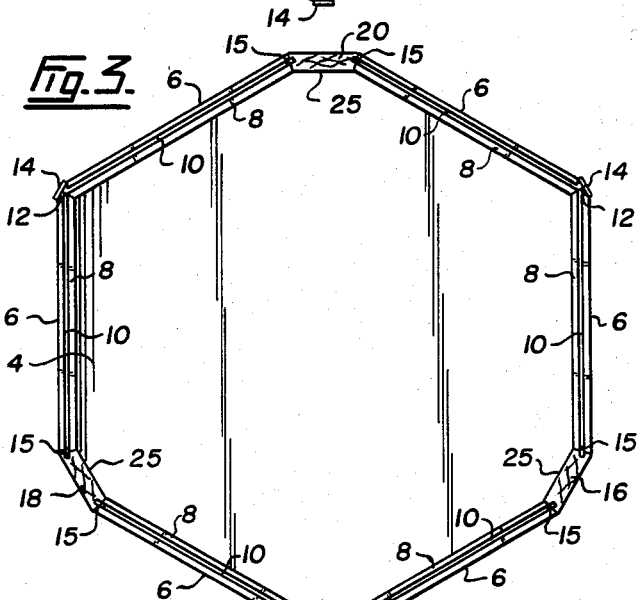
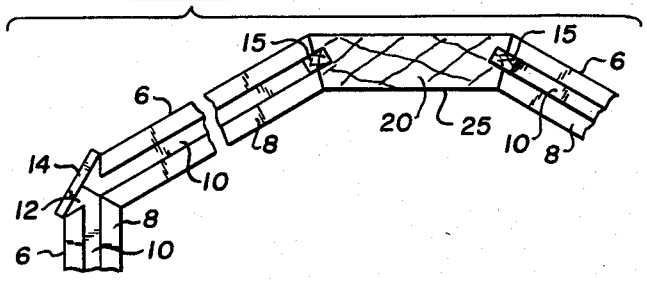

INDOOR GREENHOUSE

FIELD OF THE INVENTION

This invention relates to a housing which is particularly suitable as an indoor greenhouse.

BACKGROUND OF THE INVENTION

In many areas of the world, it is often desirable to raise plants which are not native to the area and which may require a warmer climate than provided in the particular area. It is possible to construct outdoor greenhouses to raise such plants, however, in many climates outdoor greenhouses are impratical and overly expensive for a single family use, due to the severity of the climate, both in terms of temperature and sunlight. Occasionaly it is possible to raise some such plants indoors however, for other plants the temperature and humidity even indoors is not sufficient, and for many plants insufficient sunlight is available indoors. Of course, it is often desirable to have many such plants raised indoors, both for convenience and for the sake of the appearance which many such plants have. Thus, an indoor greenhouse would often be a useful device.

A great number of greenhouses have been described previously. Many of these are not adapted for indoor use and as a result, take up an undue amount of horizontal space, while wasting vertical space which could not in any event be occupied as a result of the presence of such a structure. As well, such prior devices are usually relatively complex in construction and therefore expensive. As well, most do not make any provision for artificial lighting, and where such provision is made, the lights are horizontally disposed at a top end of the greenhouse, thereby preventing plants from being stacked on shelves in the greenhouse to take maximum advantage of vertical space in any house, as the light penetrating to the lower shelves would be insufficient for many plants. In addition, many such prior greenhouses suffer from one or more of the following disadvantages. Such greenhouses often are not readily assembled and disassembled therefore making movement of them difficult, they do not provide easy access to an area throughout the entire greenhouse, and do not provide any simple means by which the entire contents of the greenhouse may be displayed in an almost unobstructed manner when desired.

It is desirable then to have an indoor greenhouse which utilizes a minimum horizontal space, while utilizing a maximum vertical space, which is relatively simple to construct and assemble and disassemble, which provides an adequate means of artificially lighting a plurality of trays of plants stacked within the greenhouse, which provides a means of easy access throughout the entire interior of the greenhouse, and which provides a means whereby the entire contents of the greenhouse may be displayed almost completely unobstructed by the greenhouse structure when desired.

SUMMARY OF THE INVENTION

A housing which is particularly useful as an indoor greenhouse is provided. The housing has a frame which in turn has a base with a lower surface, a plurality of elongated parallel support members, and a top connected between a top end of each of the support members. The support members are connected to the base so as to extend therefrom and perpendicular to the lower surface, and perpendicularly through respective alternate apices of a first, substantially regular polygon. The housing also comprises connecting means attached to the frame. The connecting means is for connecting a pair of rectangular doors to the frame so that each door is moveable between an open and a closed position. As well, each door is connected by the connecting means to the frame so that the pair extend between the base, the top and a pair of adjacent support members and perpendicularly through respective adjacent sides of the first polygon, when both doors are in the closed position.

A second embodiment of the housing is provided which comprises a frame as described previously. A pair of rectangular doors are also provided which are dimensioned so that when both are in a closed position, the pair extend between the base, the top and a pair of adjacent support members, and perpendicularly through respective adjacent sides of the first polygon. The housing of the second embodiment is also provided with connecting means attached to the frame for connecting the pair of doors to the frame so that each door is moveable between the closed position and an open position.

Usefully, the housing of the second embodiment may also have a frame in which the support members define all the alternate apices of the first polygon. As well, the housing additionally comprises a plurality of pairs of rectangular doors, each pair being dimensioned so that when both doors of the pair are in a closed position, the pair extends between the base, the top and a corresponding pair of adjacent support members, and perpendicularly through respective adjacent sides of the first polygon. Connecting means attached to the frame is also provided. The connecting means is for connecting the pairs of doors to the frame so that a corresponding pair extends between each pair of adjacent support members, when both door sections of the pair are in the closed position. The connecting means also connects the pairs of doors to the frame so that each door is moveable between the closed position and an open position.

Usefully, the first polygon described is substantially a hexagon. As well, all of the door sections of the housing are made equal in size.

The housing may also advantageously additionally comprise socket means for mounting each of a plurality of support member.

A third embodiment of the housing is provided which comprises a frame having a base with a lower surface and a plurality of elongated support members. The support members are connected to the base so as to extend from it perpendicular to the lower surface, and transversely spaced apart to define a closed figure between them. The frame also has a top connected between a top end of each of the support members. The housing of this embodiment also comprises socket means connected to the support members for mounting each of a plurality of light tubes along an inner surface of a corresponding support member.

Advantageously, the support members of the third embodiment are transversely spaced apart to define all the apices of a first, substantially regular polygon. In addition, the housing of the third embodiment additionally comprises a plurality of rectangular doors and connecting means. Each of the rectangular doors is dimensioned so that when in a closed position each extends between the base, the top, and a corresponding pair of adjacent support members, and perpendicularly through a corresponding side of the regular polygon. The connecting means is attached to the frame for connecting the doors to it so that a corresponding door extends between each pair of adjacent support members when in the closed position, and so that each door is moveable between an open and a closed position.

Preferably, the connecting means is such as to removably connect the pairs of doors to the frame.

Usefully, the base and top have respective parallel side portions, each side portion with interconnected members transversely defining a regular polygon, congruent and aligned with the first polygon. In addition, the connecting means comprises a slotted upper end surface and a lower end surface respectively, of the members of the base and the top side portions. These slots extend the entire length of the slotted end surfaces and are dimensioned to accommodate respective doors.

Advantageously, the top of the frame has a top plate with an opening in it. The top plate being parallel to the lower surface of the base. The housing of such an embodiment also usefully additionally comprises a control housing containing a plurality of ballasts electrically connected to the socket means, and which contains a fan disposed between two air openings in the control housing. The control housing is connected to the top plate so that an air opening of the control housing communicates with the top plate opening.

Of the various types of doors which may be utilized, it is preferred that each of the doors is substantially entirely transparent.

Preferably, the housing has a maximum width of about one and one-half to two and one-half feet, and a length of between about four to seven feet. As well, the socket means is dimensioned to mount fluorescent light tubes of about four feet in length, and each of the ballasts has a capacity for a fluorescent light tube of about forty watts.

Each of the support members is usefully provided with a set of vertically spaced apart holes in it. Corresponding members of the sets of holes are coplanar, and the holes of each set are dimensioned so as to snugly receive a corresponding pin.

DRAWINGS

Embodiments of the invention will now be described with reference to the drawings in which:

FIG. 2 is a partially broken top plan view of the housing of FIG. 1;

FIG. 3 is a view along line 3—3 of FIG. 1; and

FIG. 4 is an enlarged view of a portion of FIG. 3.

DESCRIPTION OF THE PREFERRED EMBODIMENTS

Figure 1:
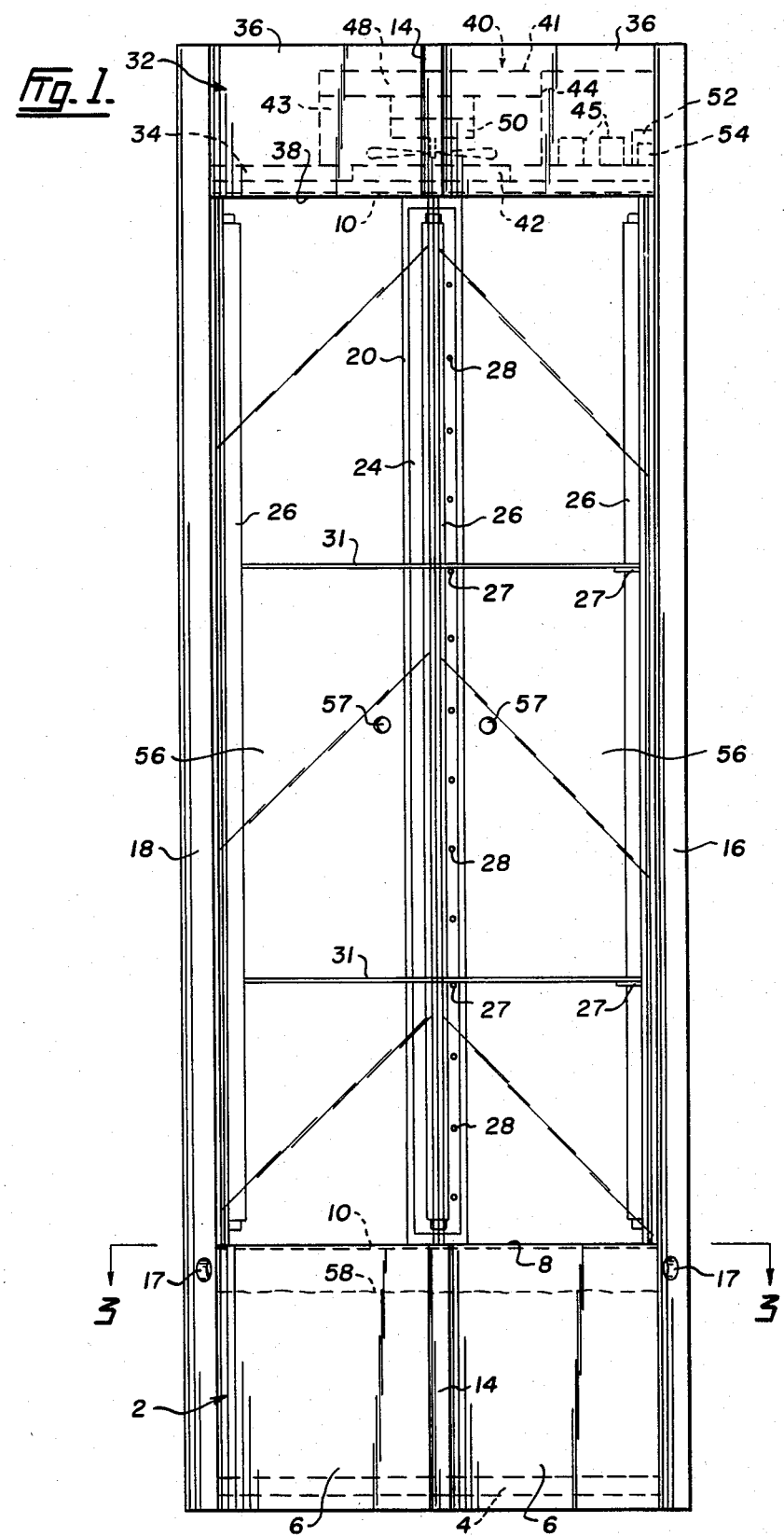
FIG. 1 is a side elevation of a housing of the present invention.

The housing shown in FIG. 1 has a frame which is conveniently made of wood, with a base 2 which has a lower surface defined by a base plate 4, of hexagonal transverse configuration. The frame also has a top 32 with a top plate 34 having an opening in it, the top plate 34 being parallel with the base plate 4. The base 2 and the top 32 each have parallel side portions composed of upstanding rectangular members 6 and members 36, respectively. The members 6 extend along and upwardly from the base plate 4, and are interconnected to transversely define a substantially regular polygon congruent and aligned with the polygon of the base plate 4.

The panels 36 also project along respective edges of the top plate 34, and upwardly and slightly downwardly from the top plate 34. The panels 36 are also interconnected to transversely define a substantially regular polygon congruent and aligned with the polygon defined by the top plate 34 and the base plate 4.

Three elongated parallel support members 16, 18 and 20 each have a lower end connected to the base plate 4, and extend perpendicularly from alternate apices of the polygon defined by the base plate 4 to a top edge of the panels 36. The panels 36 and the panels 6 are interconnected through the support members 16, 18 and 20 to only "substantially" transversely define aligned polygons since the support members 16, 18 and 20 are rectangular in shape, and are interposed between alternate adjacent pairs of edges of the panels. Each of the support members 16, 18 and 20 also have socket means 22 connected to each of them, the socket means 22 including a base 24 which is fastened to the corresponding support member 16, 18 or 20 by means of screws or the like. Each of the socket means 22 mounts a corresponding one of three fluorescent light tubes 26 along an inner surface 25 of that corresponding support member. Typically, such fluorescent light tubes 26 will be of the broad spectrum type appropriate for growing plants indoors.

Each of the rectangular members 6 of the side portion of the base 2, have an upper surface 8 with a slot 10 extending the entire length of that upper surface 8. At the point of intersection of two members 6, the slots 10 are widened for convenience of construction to produce the slot portion 12. This aspect is most clearly seen in FIG. 4. A vertical molding 14, which extends from the bottom of the side members 6 to adjacent the top surface but not above a bottom surface of the slots 10, is connected to the side members 6 to help support the joint. The side members 6 are also connected to the support members 16, 18 and 20 by means of a mortise joint as is also most clearly shown in FIG. 4. This joint utilizes a vertical molding 15 which again extends from the bottom end of the members 6 to a position no higher than the lower surface of the slots 10.

The members 36 of the top 32 are interconnected and connected to the support members 16, 18 and 20 in an identical manner as the members 6 of the base 2. Each of the members 36 is also provided with a lower surface 38 which is slotted in the same manner as the upper surface 8 of the members 6. Thus, a horizontal cross-section of the greenhouse shown in FIG. 1, taken from below the top 32 and looking in the direction of the top 32, would reveal the same disposition of members 36, the same arrangement of slots on their lower end surface 38, and the same manner of interconnection of them with the support members 16, 18 and 20, as is shown in FIG. 4 for the base 2.

Six doors 56 have their respective upper and lower edges disposed in a corresponding set of slots in the panels 6 and 36. A pair of doors extend between the base 2, the top 32, and each corresponding pair of adjacent support members 16, 18 and 20. Each of the doors 56 is made entirely of transparent glass or plastic, tinted to reduce glare from the flourescent light tubes 26. It is to be understood that "transparent" when referring to the doors 56 includes doors 56 which are so tinted, or are coloured. Each of the doors also has a handle 57 to facilitate installation and use as later described.

Each of the support members 16, 18 and 20 is provided with a set of vertically spaced apart holes 28, which also extend through the base 24 of a corresponding socket means 22. Each one of the holes 28 in any of the support members 16, 18 or 20, also has two corresponding holes in each of the other two support members which are coplanar with that hole. Thus, at various vertical levels in the greenhouse shown in FIG. 1 there will be sets of three coplanar holes spaced apart on the support members 16, 18 and 20. Each hole 28 of any set of holes 28 in a support member 16, 18 or 20, is dimensioned to snugly receive a corresponding pin 27 for that set of holes on that particular support member. In FIG. 1, a total of six pins 27 have been arranged so as to provide a set of three coplanar pins 27 at two different vertical positions within the greenhouse. Hexagonal-shaped trays 31 of wire mesh or other similar material through which air can freely pass, are placed on each of such coplanar sets of pins 27.

The greenhouse shown in the Figures also has a control housing 40. The control housing 40 contains three ballasts 45, each of which is electrically connected to a corresponding one of the socket means 22. The control housing 40 has a cover 41 with an upper air opening controllable in size by the adjustable air control 43. A fan 50 is connected to the housing 40 and is disposed between the air control 43 and a lower air opening in the control housing which communicates with an opening 42 in the top plate 34. The ballasts 45 in the housing 40 are separated from the fan 50 by means of a vertical partition 44. This is to prevent the heat generated by the ballasts from being blown into the greenhouse when the fan 50 is operated to blow air into the greenhouse. Heat from the ballasts 45 escapes through vents 46 in the cover 41 of the housing 40. As is shown in FIG. 1, a dust filter 48 may be positioned over the air control 43 for preventing dust from entering the greenhouse when the fan 50 is in the last-mentioned mode. The housing 40 is also provided with a timer control 52 and a control switch 54. The timer control 52 and control switch 54 extend beyond a side member 36 of the top 32. The control switch 54 is electrically connected to the ballast and fan 50 so as to be capable of turning them on and off. The timer control 52 is of a type which allows setting of the time and duration for which the fan 50 and fluorescent light tubes 26 will be activated.

The entire housing is shown in the Figures is about two feet in width, and about five and one-half feet in height. As well, the socket means 22 are such as to accommodate fluorescent light tubes 26 of about four feet in length, and each of the ballasts has a capacity for fluorescent light tube 26 of about forty watts.

As mentioned previously, for minimum cost and appearance the entire greenhouse, other than the housing 40 and the components contained within it which are mostly metal, is conveniently made of wood, while the doors 56 are preferably of glass or a transparent plastic. When it is desired to use the greenhouse, if the doors 56 have not previously been installed, then each is slid into position simply by simultaneously sliding a lower and an upper end of it and the top 32, and into a slot 10 of a corresponding member 6 of the base 2 and a similar slot of a corresponding member 36 of the top 32. When all of the doors are slid into a closed position, the configuration shown in FIG. 1 is obtained. Each of the doors of course, may be partially opened at any time simply by reversing the movement of installation, or can be completely removed. Handles 57 attached to each door 56 facilitates removal and installation. Either prior to installation of the doors 56 or after their installation, simply by removing one or more of the doors 56 or sliding it into an open position, soil 58 can be placed in the base 2 in which plants can be grown. As well, virtually any number of shelves 31 can be positioned within the greenhouse to accommodate potted plants of various sizes simply by placing pins 27 in holes 28 and holes 30 in the support members 16, 18 and 20 at the desired vertical position in the greenhouse.

The fan can be arranged to either blow air downward into the greenhouse, or to expel it from the top end of the greenhouse into the surrounding air. Vent holes 17 in the support members 16, 18 and 20 facilitate such air circulation. Such arrangement of the fan is accomplished simply by changing the fan blade, which may be conveniently made of plastic, so that the fan 50 will blow air in the desired direction. Of course, electronic controls could also be provided preferably in the control housing 40, which could reverse the direction of the fan motor as desired. Typically, where the plants in the greenhouse require a temperature higher than the surrounding air in the house or other building in which the greenhouse is used, the fan will be arranged to blow air into the top of the greenhouse. Where the plants require air which is at, or cooler than, the surrounding air temperature outside the greenhouse, then the fan will be arranged to draw air in through the air vents 17.

The fluorescent light tubes 26 generally provide sufficient heat to grow a wide range of plants which may require a temperature greater than the surrounding air temperature. In fact, the heat provided by the fluorescent light tubes 26 is usually too great for such purposes, and holes 35 in the top plate 34 are provided to allow excess heat generated by the fluorescent light tubes 26 to escape. The particular arrangement of the fluorescent light tubes 26 when installed is particularly advantageous in that even lighting of all of the plants which may be contained within the greenhouse is obtained. If fluorescent light tubes were disposed only on the top 32 of the greenhouse, then of course, plants in lower shelves 31 or at the base 2 of the greenhouse would not generally obtain sufficient light. However, if it is desired to make the greenhouse of greater diameter, then stronger fluorescent light tubes than 40 watts should be substituted, since the effective growing zone of a 40 watt fluorescent full spectrum light tube is only about one foot in so far as most plants are concerned. Due to the vertical arrangement of the fluorescent light tubes 26, the greenhouse can be artificially lighted, and yet take up minimum horizontal floor space while making use of maximum vertical space which would otherwise remain empty should an indoor greenhouse with horizontally disposed light tubes be used, since such a greenhouse would not be able to provide sufficient artificial lighting for a number of vertically separated shelves of plants.

The transverse hexagonal shape of the greenhouse is particularly suitable for many houses or other buildings since the greenhouse will sit snugly within a corner of a room and leave little wasted horizontal space as might a greenhouse with a transverse circular configuration. When it is desired to display plants contained in the greenhouse, all of the doors 56 may be removed in the manner previously described so that an almost unobstructed view of the plants is obtained, the only potential obstructions being from support members 16, 18 and 20.

Various modifications to the greenhouse described above are of course, possible. For example, the frame can be constructed from metal or plastic. As well, connecting means other than those described can be used. For example, hinges could be used in which the hinge pins can be readily slid out of their barrels. As well, other shapes of the housing are possible. For example, a circular housing with curved doors could be used, however, typically such a housing will be more expensive since curved doors are typically more expensive than flat ones. The size of the greenhouse described may also be altered, although as mentioned above, if the same amount of light is to reach all of the plants, then it may be necessary to use stronger fluorescent light tubes than 40 watts. Another possible variation is to omit the side members 6 and 36 and to place the slots for accommodating the doors 56 in the base plate 4 and top plate 34. However, this exposes the control housing 40 to view from a side and also does not provide a container for soil at the bottom of the greenhouse for growing plants too large to be placed in pots.

As will be apparent to those skilled in the art in light of the foregoing disclosure, many alterations and modifications are possible in the practise of this invention without departing from the spirit or scope thereof. Accordingly, the scope of the invention is to be construed in accordance with the substance defined by the following claims.

I claim:
1. A housing comprising:
   (a) a frame having:
      (i) a base with a lower surface;
      (ii) a plurality of elongated support members connected to the base so as to extend therefrom perpendicular to the lower surface, and transversely spaced apart to define all the alternate apices of a first, substantially regular polygon perpendicular thereto;
      (iii) a top connected between a top end of each of the support members;
   (b) a plurality of pairs of rectangular doors, each pair dimensioned so that when both doors thereof are in a closed position, the pair extends between the base, the top, and a corresponding pair of adjacent support members, and perpendicularly through respective adjacent sides of the first polygon; and
   (c) connecting means attached to said frame for removably connecting said pairs of doors thereto so that a corresponding pair extends between each pair of adjacent support members when both door sections of the pair are in the closed position, and so that each door is moveable between an open and a closed position, and said connecting means comprising a slotted upper end surface and lower end surface respectively, of the members of the base and top side portions, the slots extending the entire length of the slotted end surfaces and dimensioned to accommodate respective doors;
   (d) socket means connected to the support members for mounting each of a plurality of light tubes vertically along an inner surface of a corresponding support member.

2. A housing as described in claim 1 wherein the first polygon is substantially a hexagon, and wherein all of the door sections are equal sized.

3. A housing as described in claim 1, wherein the top has a top plate with an opening therein, the top plate being parallel to the lower surface of the base, and additionally comprising a control housing containing a plurality of ballasts electrically connected to said socket means and containing a fan disposed between two air openings in the control housing, the control housing being connected to the top plate so that an air opening of the control housing communicates with the top plate opening.

4. A housing as described in claim 1, wherein each of the doors is substantially entirely transparent.

5. A housing as described in claim 3 wherein the housing has a maximum width of between about 1 ½ to 2 ½ feet, and a length of between about 4 to 7 feet, and wherein said socket means is dimensioned to mount fluorescent light tubes of about 4 feet in length, and each of the ballasts has a capacity for a fluorescent light tube of about 40 watts.

6. A housing as described in claim 1 wherein each of said support members has a set of vertically spaced apart holes therein, corresponding members of the sets being coplanar and the holes of each set being dimensioned so as to snugly receive a corresponding pin.

* * * * *